July 7, 1936.    E. V. MOTT    2,046,962

CIRCUIT PROTECTING SYSTEM

Filed May 28, 1934

Inventor:
E. V. Mott
Eugene E. Brown
Attorney

Patented July 7, 1936

2,046,962

UNITED STATES PATENT OFFICE 2,046,962

CIRCUIT PROTECTING SYSTEM

Everett V. Mott, Metuchen, N. J., assignor to The Western Union Telegraph Company, New York, N. Y., a corporation of New York Application May 28, 1934, Serial No. 728,012

5 Claims. (Cl. 175—294)

This invention relates to a method of preserving the continuity of service in circuits for transmitting power which are subject to abnormal surges of current due to lightning or other causes. While this method of protecting circuits is especially advantageous in protecting battery feed wire circuits for transmitting power between telegraph offices, where the source of current is located in one office and is transmitted to other offices through cable or open conductor requiring current for the operation of telegraph equipment, it is adapted for use in circuits used for other purposes.

Telegraph circuits are provided with thermally operated fuses at the main and branch offices to protect the instruments and other equipment and at intervals along the connecting lines or cables with arresters which divert and short circuit abnormal current surges to ground. While the arrester may protect the apparatus from injury by by-passing the lightning surge directly to ground, nevertheless in transmission circuits of the type referred to, the generator current which follows the path provided by the lightning surge through the arrester is very heavy, due to the low resistance of this grounded generator circuit and invariably blows the lowest capacity fuse between the operated arrester and the generator. The fuse must be replaced before service can be restored on the circuit.

The object of my invention is to provide means which opens the generator circuit at the central office in an interval of a shorter duration than that required to operate any of the fuses in this circuit, and, after the abnormal surge has been dissipated through the arrester to automatically restore the circuit for normal operation, thus avoiding the use of manually operated switches and the necessity of operation by an attendant.

In the following description I shall refer to the accompanying drawing in which—

The power transmission circuit is provided with fuses F at the central office to protect the generator G and the office apparatus or equipment. The branch offices are likewise protected with fuses. At all of the offices and at intervals along the line or cable, arresters LA are connected to provide a path to ground or short circuit any abnormal surge due to lightning, accidental cross with a high voltage line or other cause.

Figure 1:
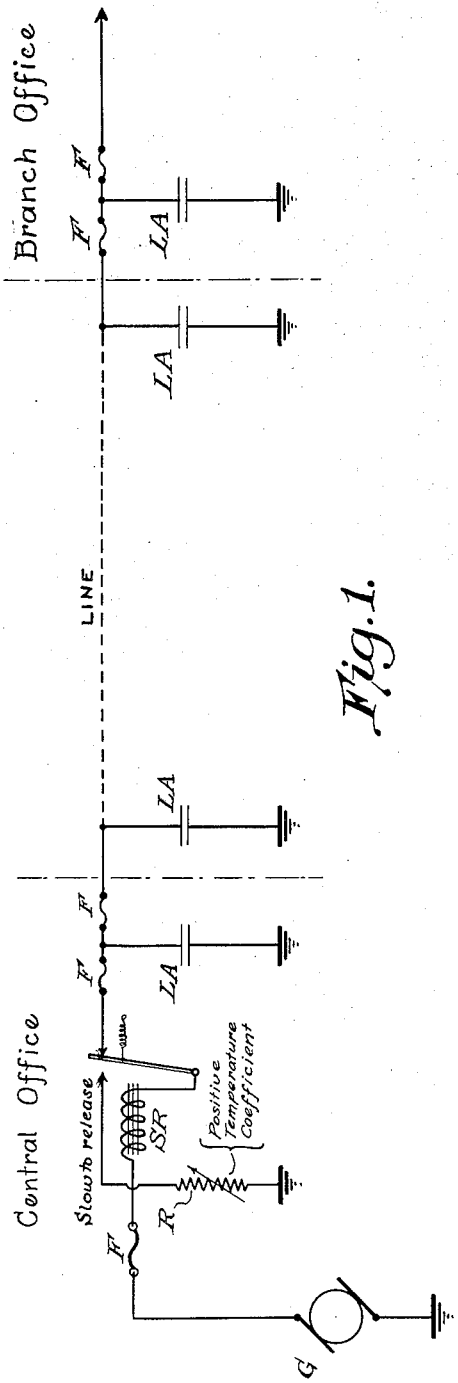
Figure 1 is a diagram illustrating a power transmission circuit embodying my invention.
Figure 2:
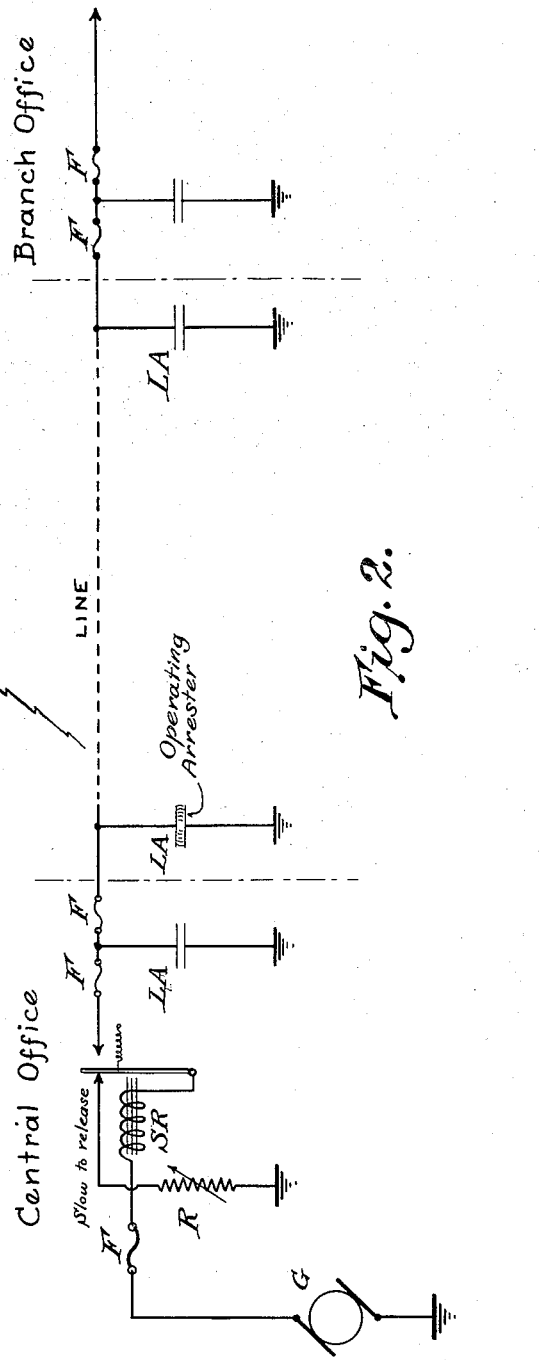
Figure 2 is a diagram of the same circuit showing an arc due to a lightning surge closing the gap across an arrester, and the generator circuit automatically opened at the central office, the fuses remaining intact.

As previously pointed out, while the normal voltage supplied to the line by the generator G is insufficient to operate any of the arresters LA, yet the generator current will readily follow across the path of an arc established through an arrester by a lightning surge. The resistance of such short circuit to ground is so low that an abnormally large current will flow from the generator G which not only blows one or more of the intermediate fuses but is liable to cause other and more serious damage. These fuses must be replaced by an attendant and the circuit must usually be thereafter closed by manually operated switches. In order to overcome these difficulties I provide at the central office an automatically operating self-restoring relay device SR, electromagnetically actuated, which responds nearly instantaneously to an abnormal current to disconnect the generator from the line circuit. I have shown this automatic device as an electromagnetic switch having its operating coil connected through the armature directly in the line circuit. The retractile spring is adjusted to hold the armature against the front contact in opposition to the pull of the magnet during the flow of normal generator current, but responds to a pre-determined pull due to a critical increased value of current. The magnet operates, therefore, to instantly retract the armature against its back contact upon the flow of more than said critical value of current from the generator due to a short-circuit established by the operation of any arrester LA. I have illustrated the latter condition in Fig. 2.

If the lightning surge is merely momentary, it would be sufficient if the relay armature were allowed to immediately return to its front contact to reestablish the line circuit. Inasmuch, however, as the abnormal condition due to a surge is liable to continue during a short interval, I provide some means for delaying or retarding the return movement of the armature to its front contact. As one means of accomplishing this, I connect to the back contact a grounded resistance R, having a positive temperature coefficient. When the armature is first drawn into engagement with the back contact the resistance R is cold and permits current to pass sufficient to hold the armature, but as the resistance becomes heated by the passage of current its resistance increases until the current is reduced to such an extent that the magnet releases the armature, thereby restoring the connection of the generator to the line. The time of release may be accurately determined by adjusting the value of the resistance and selecting the resistance material having the proper temperature coefficient to suit the circuit conditions.

The advantages which accrue from my circuit protecting system will be evident from the description. The protection afforded is entirely automatic, eliminating the burning out and replacement of fuses and the manual resetting of switches after a lightning surge. The sudden operation of the armature at the instant the current reaches the predetermined critical value assures the disconnection of the generator before the current reaches a destructive value and assures complete protection of the office equipment. The delay in the release of the armature provides for the passage of the usual surge condition and the automatic restoration of the line circuit under normal conditions.

I have described in detail the particular apparatus and arrangement illustrated for the purpose of clearly disclosing the invention but it will be evident to engineers that various changes and modifications can be made within the scope of my claims.

I claim:

1. A protecting arrangement for electrical transmission systems wherein a line or cable is provided at intervals with protector devices adapted to shunt an abnormal current surge to ground over an arc produced by said surge, said arrangement comprising an electromagnetic switch adapted to open the circuit between a protector device and the current source, said switch being provided with front and back contacts and having a magnet coil and an armature normally in series in the line, and retarding means embodying a grounded resistance having a positive temperature coefficient connected to said back contact, whereby the armature is restored to normal position after a predetermined interval.

2. A protecting arrangement for electrical transmission systems wherein a line or cable is provided at intervals with protector devices adapted to shunt an abnormal current surge to ground over an arc produced by said surge, said arrangement comprising an electromagnetic switch adapted to open the circuit between a protector device and the current source, said switch having front and back contacts, a magnet coil and an armature, said coil and armature being normally in series in the line, means for holding the armature against its front contact in opposition to the pull of the magnet but adapted to release the armature upon the occurrence of a predetermined increase of current, and means embodying a grounded resistance having a positive temperature coefficient operating to retard the return of the armature to its front contact.

3. The combination with an electrical transmission line having a grounded source of current, of protecting devices connected at intervals to said line, each device providing a shunt path to ground for abnormally high voltages, an electromagnetic switch provided with front and back contacts and having an operating coil and armature, said coil and armature being connected in series with the line between said source and said protecting devices, retractile means normally holding the armature against its front contact to maintain the line circuit closed, said coil having a magnetic pull operating to overcome said retractile means to open the line circuit upon the occurrence of an abnormally high current and a grounded resistance element having a positive temperature coefficient connected to the back armature contact.

4. In the combination set forth in claim 3 said element having a resistance having a positive temperature coefficient of such values that only the initial current therethrough for a predetermined interval is sufficient to hold the armature against its back contact.

5. The combination of an electrical transmission line having a grounded source of current, of protecting devices connected at intervals to provide shunt paths to ground upon the occurrence of a lightning or power surge, an electromagnetic switch provided with front and back contacts and having an operating coil and armature normally connected through its front contact to the line circuit between said source and said protecting devices, means normally holding the armature against its front contact to close the line circuit, the magnetic pull of said coil operating to move the armature to its back contact to open the line circuit upon the occurrence of an abnormal value of current and means connected to the back contact and controlled by the flow of current therethrough operating to automatically restore the engagement of the armature with its front contact after a predetermined interval.

EVERETT V. MOTT.